United States Patent [19]
Bell et al.

[11] Patent Number: 5,594,732
[45] Date of Patent: Jan. 14, 1997

[54] BRIDGING AND SIGNALLING SUBSYSTEMS AND METHODS FOR PRIVATE AND HYBRID COMMUNICATIONS SYSTEMS INCLUDING MULTIMEDIA SYSTEMS

[75] Inventors: Robert T. Bell, Garland; Richard B. Platt, Allen, both of Tex.

[73] Assignee: Intecom, Incorporated, Dallas, Tex.

[21] Appl. No.: 397,986

[22] Filed: Mar. 3, 1995

[51] Int. Cl.$^6$ .................................................. H04J 3/02
[52] U.S. Cl. ........................ 370/401; 370/410; 370/471
[58] Field of Search ........................... 370/85.13, 85.12, 370/85.15, 85.6, 85.1, 60, 94.1, 94.2, 85.4, 94.3, 110.1, 68.1, 16, 16.1, 85.11, 85.3, 43, 99, 108; 340/827, 825.05, 825.02; 371/8.1, 8.2, 11.1, 11.2, 37.7; 395/181.01, 181.02, 181, 183.01

[56] References Cited

U.S. PATENT DOCUMENTS

| 4,901,312 | 2/1990 | Hui et al. ........................ 370/85.12 |
| 5,140,587 | 8/1992 | Mueller et al. ................... 370/85.15 |
| 5,406,555 | 4/1995 | Yoshida ............................. 370/60 |

*Primary Examiner*—Douglas W. Olms
*Assistant Examiner*—Dang Ton
*Attorney, Agent, or Firm*—Hitt Chwang & Gaines, P.C.

[57] ABSTRACT

A subsystem for communicating a private network signalling message over a packet network and bridges for communicating a Media Access Control (MAC) layer frame over an isochronous channel and for communicating an isochronous signalling frame over a nonisochronous network. The subsystem comprises: (1) an encapsulation circuit, coupled to a transmitting user station, capable of receiving the private network signalling message from the transmitting user station, the encapsulating circuit encapsulating the signalling message within, and adding source and destination addresses to, a routable protocol frame, the source and destination addresses corresponding to addresses of the transmitting user station and a particular receiving user station, the encapsulation circuit queuing the routable protocol frame for transmission over the packet network and (2) a de-encapsulation circuit, coupled to the particular receiving user station, capable of receiving the routable protocol frame, the de-encapsulation circuit extracting the signalling message from the routable protocol frame, the packet network thereby simulating a point-to-point connection between the transmitting and particular receiving user stations to effect node-to-node private network signalling therebetween.

64 Claims, 6 Drawing Sheets

BRIDGING AND SIGNALLING SUBSYSTEMS AND METHODS FOR PRIVATE AND HYBRID COMMUNICATIONS SYSTEMS INCLUDING MULTIMEDIA SYSTEMS

CROSS-REFERENCE TO RELATED APPLICATIONS

This application is related to the following U.S. patent applications:

| Serial No. | Title | Inventor(s) | Filing Date |
| --- | --- | --- | --- |
| 08/397,945 | SYSTEM AND METHOD FOR SIGNALLING AND CALL PROCESSING FOR PRIVATE AND HYBRID COMMUNICATIONS SYSTEMS INCLUDING MULTIMEDIA SYSTEMS | Robert T. Bell, et al. | March 3, 1995 |
| 08/379,365 | MULTIMEDIA SYSTEM HAVING CENTRAL POWER SOURCE AND DISTRIBUTION SUBSYSTEM | Richard K. Hunter, et al. | January 27, 1995 |

The above-listed applications are commonly assigned with the present invention and are incorporated herein by reference as if reproduced herein in their entirety.

TECHNICAL FIELD OF THE INVENTION

The present invention is directed, in general, to multimedia systems and, more specifically, to a system for communicating a private network signalling message over a packet network, and bridges for communicating a Media Access Control ("MAC") layer frame over an isochronous channel and for communicating an isochronous signalling frame over a nonisochronous network.

BACKGROUND OF THE INVENTION

Currently, "Information superhighway" and "multimedia" are probably the most often spoken and least often understood aspects of a coming revolution in data communication. Although issues specific to an information superhighway are beyond the scope of the present discussion, interactive multimedia systems are very much within the present scope.

An interactive multimedia system is broadly defined as a system capable of processing, storing, communicating and coordinating data pertaining to visual information, aural information and other information. Visual information is generally divided into still picture or graphics and full motion video or animation categories. In the vernacular of those involved in multimedia, such visual information is generically referred to as "video." Aural information is generally divided into speech and non-speech categories and is generically referred to as "voice." "Other information." is directed primarily to computer data, often organized in files and records, and perhaps constituting textual and graphical data. Such computer data are generally referred to as "data."

To date, multimedia has, for the most part, been limited to stand-alone computer systems or computer systems linked together in a local area network ("LAN"). While such isolated systems have proven popular and entertaining, the true value of multimedia will become apparent only when multimedia-capable wide area networks ("WANs") and protocol systems are developed, standardized and installed that permit truly interactive multimedia. Such multimedia systems will allow long distance communication of useful quantities of coordinated voice, video and data, providing, in effect, a multimedia extension to the voice-only services of the ubiquitous telephone network.

Defining the structure and operation of an interactive multimedia system is a critical first step in the development of such system. Accordingly, before entering into a discussion herein of more specific design issues, it is important to discuss more general questions that need to be resolved concerning design objectives of the system as a whole and some generally agreed-upon answers and specifications.

Interactive multimedia may be thought of as an electronic approximation of the paradigm of interactive group discussion. It involves the interactive exchange of voice, video and data between two or more people through an electronic medium in real time. Because of its interactive and real-time nature, there are some stringent requirements and required services not normally associated with multimedia retrieval systems. Some of the more obvious examples of those requirements and services include latency (transmission delay), conferencing, availability ("up-time") and WAN interoperability.

The evolution of existing private branch exchange ("PBX") and LAN topologies towards a composite interactive multimedia system based upon client/server architectures and isochronous networks is a natural trend. However, to merge the disparate mediums of voice, video and data successfully into a cohesive network requires that three fundamental integration issues be defined and resolved. The first of the fundamental integration issues is quality of service ("QoS"). QoS is defined as the effective communication bandwidth, services and media quality coupling of separate equipment or "terminals" together and the availability ("up-time") of the same. QoS parameters are divided into four groups: 1) terminal QoS, 2) network QoS, 3) system QoS, and 4) availability requirements. Thus, QoS parameters must be defined for both terminal equipment ("TE") and network equipment ("NE") governing the communication of data between the TE. System QoS is derived from a combination of terminal and network QoS. The suggested values for QoS parameters are considered to be a practical compromise between required service quality, technology and cost. See, Multimedia Communications Forum ("MMCF") Working Document "Architecture and Network QoS", ARCH/QOS/94-001, Rev. 1.7, MMCF, (September 1994) and ITU-T Recommendation 1,350 "General Aspects of Quality of Service and Network Performance in Digital Networks, including Integrated Services Digital Networks ("ISDNs"), (1993). The following Table I summarizes some suggested parameters for terminal QoS.

TABLE I

| | Terminal QoS Parameters | |
| --- | --- | --- |
| Parameter Type | Parameter Value | Parameter Explanation |
| Audio Frequency Range | 3.4 kHz | Optimization is for voice, and is consistent with existing Legacy voice systems. |
| Audio Level | −10 dBmO | Optimization is for voice, and is consistent with |

TABLE I-continued

Terminal QoS Parameters

| Parameter Type | Parameter Value | Parameter Explanation |
|---|---|---|
| Audio Encoding | G.711 (8-bit pulse code modulaton ("PCM")) | Legacy voice systems. Consistent with Legacy voice systems. |
| Video Resolution | ≧352 × 288 (SIF) | Minimal acceptable size for video conferencing. |
| Video Frame Rate | ≧20 frames per second (fps) | Minimal optimization for detection of facial expression transitions. |
| Voice/Video Intramedia-Intermedia Differential Delay | <100 milliseconds (ms) | A differential delay greater than 100 ms between voice & video is noticeably significant. |
| Video Encoding | H.261 & Motion Picture Experts Group ("MPEG")-1 | H.261 meets WAN interoperability, MPEG-1 is more consistent with desktop trends and quality requirements. |
| Intramedia Latency (TE) | <100 ms | The delay of the TE itself for encoding and framing purposes. |
| User Data Rate | ≧64 kbps | Minimal acceptable data bandwidth for data sharing applications. Consistent with ISDN Basic Rate Instrument ("BRI"). |
| Data Encoding | HDLC encapsulation | Consistent with isochronous service bearer channels. |

Network QoS parameter requirements consist of those parts of the system that are between two TE endpoints. This includes a portion of the TE itself, the private network (if required), and the public network (if required). Some of the requirements imposed upon the network QoS are a result of the terminal QoS parameters. The following Table II summarizes the network QoS requirements.

TABLE II

Network QoS Parameters

| Parameter Type | Parameter Value | Parameter Explanation |
|---|---|---|
| Intramedia Latency (NE) | <50 ms | Intramedia latency is the delay between source TE transmission and destination TE reception; i.e. the delay of NE. |
| Network Capacity | ≧1,536 kbps | G.711 Audio (64 (kbps), MPEG-1 Video (1,344 kbps), HDLC data (128 kbps). |

The system QoS encompasses the terminal and network elements. The particular value critical to the system is the intramedia latency. The following Table III summarizes this value that is the sum of the terminal and network values for the same parameter.

TABLE III

System QoS Parameters

| Parameter Type | Parameter Value | Parameter Explanation |
|---|---|---|
| Intramedia Latency (System) | <150 ms | Intramedia latency is the delay between source transmission and destination reception. It includes latency imposed by the source and destination TEs as well as the NE. These latency values might include encoding and decoding delays, transmission delays, and adaptation delays. |

The system QoS parameter of Intramedia Latency is the sum of twice the TE and the NE latency. Intramedia Latency parameter value is bounded by voice requirements since latent delay is more readily perceived by the ear than the eye. However, the delay itself is typically a function of video since it is the component requiring the most time for encoding and decoding.

Availability ("up-time") includes several aspects. In particular, the network elements have very strict requirements. These requirements are typical of private branch exchanges ("PBXs") and other private network voice equipment, but are very atypical of Legacy LANs. Most LANs are susceptible to power-losses, single points of failure, and errant TE. An interactive multimedia system must closely follow the availability requirements of the legacy voice systems. The following Table IV summarizes Availability QoS parameters.

TABLE IV

Availability QoS Parameters

| Parameter Type | Parameter Value | Parameter Explanation |
|---|---|---|
| TE Power Requirements | 5 watts (W) of phantom power (48 volts (V)) | This power requirement is consistent with the ISDN BRI requirements and will allow the least common denominator of voice to function. |
| NE Power Requirements | Uninterruptable power supply ("UPS") | NE must be UPS capable including private NE. |
| Single point of failure | 12 Users | No more than 12 users should be impacted by a single point of failure. |
| Error Free Seconds Ratio ("EFS") | >99.9% | Meets requirement of random bit error rate of $10^{-6}$. |

The availability requirements are defined solely within the context of the private network. Additional availability parameters are discussed in G.821. See also, MMCF Working Document "Architecture and Network QOS", ARCH/QOS/94-001, Rev. 1.7, Multimedia Communications Forum, Inc., (September 1994) and TR-TSY-000499, Transport Systems Generic Requirements (TSGR): Common Requirements, Bellcore Technical Reference, Issue 3, (December 1989).

The second of the fundamental integration issues is network services. Network services include transport services, connection management and feature management. Multimedia communication involves the transmission of data having more varied characteristics than video, voice or data in isolation. Therefore, the manner in which the network transports and manages the flow of video, voice and data is critical to the efficiency, flexibility and overall effectiveness of the network.

Transport services can be categorized into three groups: 1) packet, 2) circuit and 3) cell. The following Table V summarizes different aspects of each of these transport services.

TABLE V

| | Transport Services | | |
|---|---|---|---|
| | Packet | Circuit | Cell |
| Typical technology | Ethernet ®, Token Ring ®, Frame Relay ®, etc. | ISDN, T1 | Asynchronous Transfer Mode ("ATM") |
| Media optimization | Packet data | Isochronous data (voice, video) | Packet & isochronous data |
| Transport optimization | Multicast, shared medium operations | Point-point, full-duplex, low-cost switching | Point-point, full-duplex, high-speed switching |
| Optimized data size | 1500 bytes (Ethernet ®) | 1 byte (voice) | 48 bytes |
| Transport Overhead | 4.2% (64 bytes - IP) | none | 11.3% (6 bytes - AAL1) |
| Transport Methodology | Shared | Switched | Switched |
| Route Methodology | Routing | Signalling (circuit switching) | Signalling (virtual circuit switching) |
| Typical Deployment | Widespread. Deployed as LAN | Widespread. Deployed as both public network and private NE | Very few installations. Typically deployed as private backbone network |

Interactive multimedia requires the usage of an isochronous network because of the QoS requirements for voice and video. While it is possible to construct a packet network with sufficient bandwidth, buffering and intelligence to accommodate synchronous traffic it is considered to be prohibitively expensive and unnecessary. Nevertheless, both the LAN, PBX and WAN require interoperability.

At some point it is expected that the entire private network infrastructure will employ ATM. This will transpire upon the occurrence of several events. First, WANs must adapt to support ATM Points-of-Presence ("POPs"). Second, the telephone must disappear from the premise (replaced by an ATM audio device). Third, packet-based LAN TE must become ATM TE. Fourth, phantom power must be supported to the ATM TE (for availability purposes). Fifth, an 8 kHz synchronous clock must be supported and managed by all ATM equipment. Finally, the price of ATM TE and NE must approach that of Ethernet®, ISDN, and isoEthernet® equipment.

Regardless of the interim private network infrastructure, ATM is the only backbone solution for the private network. It is the only scalable switching architecture that can transport packet and isochronous data. Furthermore, because it is deployed as a backbone, the aforementioned issues do not apply.

Connection management is the process employed by the private and public network routing functions. Because packet routing is a well established and defined process, it is not discussed further. Connection management within the confines of an isochronous network for interactive multimedia is a newer technology (albeit with old roots) and deserves discussion.

Signalling for circuit and cell switching is best defined by the ISDN signalling standards (see, TR-NWT-000938, Network Transmission Interface and Performance Specification Supporting Integrated Digital Services Network (ISDN), Bellcore Technical Reference, Issue 1, (August 1990)), isoEthernet® signalling (see, IEEE Proposed Standard 802.9a, "Isochronous services with Carrier Sense Multiple Access with Collision Detection (CSMA/CD) Media Access Control (MAC) service", (December 1994)) and ATM signalling (see, ATM Forum, "ATM User-Network Interface Specification—Version 3.0", (September 1993) and ITU-T Recommendation Q.293x, "Generic Concepts for the Support of Multipoint and Multiconnection Calls"; (1993)). Historically, isochronous networks carry the signalling channel as an isochronous channel. Nevertheless, the signalling function can be shown to be better suited to a packet channel. A hub/routing function is the ideal location to perform the bridging between an isochronous signalling channel and a packet signalling channel. The natural packet protocol choice for a signalling channel is an Internet Protocol ("IETF IP"). Available on most LAN networks, as well as global routing capability, IP greatly enhances the signalling requirement of interactive multimedia.

Feature management consists of the management of those features provided by the private and public network for interactivity purposes. The PBX is followed as a model for interactive multimedia features. The following Table VI summarizes some of the more common features.

TABLE VI

| | Feature Management | |
|---|---|---|
| System Services | User Services | Maintenance |
| Account Codes | Buzz Station | Automatic Restart |
| Authorization Codes | Callback | Connection Detail Recording |
| Automatic Number Identification | Call Forward | Default Installation |
| Direct Inward Dialing ("DID") | Call Park | Class of Service |
| Direct Outward Dialing ("DOD") | Call Pickup | Hot Configuration |
| Hunt Groups | Call Waiting | |
| Multimedia on hold | Do Not Disturb/Override | |
| Network Numbering Plan | Hold/Consultation Hold | |
| Number Dial Plan | Last Number Redial | |
| Shared Resource Queuing | Multiple/Shared Call Appearances | |
| System Speed Dialing | Conference (multiparty) | |
| Vacant Number Intercept | Transfer | |

The third of the fundamental integration issues is interoperability. An interactive multimedia system by nature implies interoperability, because a multimedia network as envisioned is too large and far-flung to employ the equipment of only a single supplier. Therefore, standards must be established that allow equipment from different suppliers to interact smoothly. To this end, interoperability must extend to transport mechanisms, signalling and compression standards.

There are certain existing communication technologies that must be supported and others that are used. A truly interoperable interactive multimedia system should guarantee that the physical and logical interfaces of each component adheres to a standard. Prior to 1992, this would have been almost impossible. The present day affords the opportunity to evolve the proprietary telephony of the PBX and the proprietary video of the video conferencing systems into standards-based systems in the same manner that the data systems evolved from proprietary mainframes to the standards-based LAN systems of today. The following Table VII summarizes the required standards of interoperability.

TABLE VII

| | Interoperability Standards | |
|---|---|---|
| Transport Standards | Signalling Standards | Compression Standards |
| isoEthernet ® (IEEE 802.9a) | ISDN NI-2 | G.711, G.722 (Audio) |
| ATM | QSIG | H.221 (Video) |
| ISDN | Q.2931 | MPEG-1 (Video) |
| | H.320 (Audiovisual) | |

In addition to the standards required for communications, there are other specifications relating to application programming interfaces for terminal and server control. These include Microsoft® Telephony Application Programming Interface ("TAPI®"), Novell® Telephony Service Application Programming Interface ("TSAPI®") and Microsoft® Open DataBase Connectivity ("ODBC®").

Having now set the stage with a discussion of general issues concerning multimedia systems, more specific design issues may now be discussed. The specific design issue of concern is provision of signalling within a private network or a hybrid network and a method to accomplish the signalling function between stations or nodes in the network.

Traditionally, isochronous devices such as telephones and video conferencing equipment have signalled in-band. "In-band," in traditional telephony, is defined as use of the same physical path for signalling and user information, such as voice, circuit mode and video data. In contrast, ISDN employs a D-channel, that, although carried over the same physical medium as the B-channels, is logically regarded as a separate channel. In the telephony world, this is defined as "out-of-band" signalling.

However, since signalling services are intermittent processes, it is not necessary to perform this signalling within an isochronous channel. In fact, there is great benefit to be achieved by performing this signalling over a packet service or medium.

There are several key advantages to signalling over a packet service including, but not limited to, backbone signalling with simple circuit connectivity, routing, remote control, multicasting, and other operational benefits. Moreover, one of the advantageous aspects of using such signalling is the separation of the call control process from the circuit connection process. Because these two processes are implicitly separate, simplicity is achieved in call control through unknown networks. By establishing a data link between endpoints independent of the circuit connection, all feature management is transparently achieved. This is an absolutely essential feature for "work-at-home" and for similar applications that traverse the public network. However, there are limitations, such as the bridging function between the isochronous signalling channel and the packet channel, unencountered in current signalling technology, that must be addressed before such signalling is commercially viable.

In further support of packet-based signalling, as the size and complexity of modern private and hybrid private/public networks increase, the mechanisms for communication of signalling information from one node to another become increasingly cumbersome and/or expensive. The simplest signalling network is a fully-webbed net in which each node has a direct connection to every other node in the network. This becomes prohibitively expensive as the number of nodes increases. The number of connections needed is equal to (n(n−1))/2, where n is the number of nodes. If the network is configured to use fewer inter-nodal signalling paths, the complexity of the network topology increases significantly as the number of nodes increases. Modern packet technology allows for the establishment of multiple virtual connections without requiring full webbing of the physical connections. The problem is to develop a process for using this capability and applying it to private network signalling procedures such as QSIG.

Accordingly, what is needed in the art is a signalling subsystem and method that accomplishes the hub/routing/bridging functions between the isochronous signalling channel and the packet channel. Furthermore, what is needed in the art is a system for allowing the establishment of separate virtual connections within the context of conventional packet network topologies to provide a virtual signalling path from every node to every other node within a private network without requiring multiple physical connections for each node.

SUMMARY OF THE INVENTION

To address the above-discussed deficiencies of the prior art, it is a primary object of the present invention to provide a system, employing hubs and bridges, for cross-translating telephony and computer network protocols. This cross-translating allows, in one significant aspect, packet-based signalling, significantly enhancing the bandwidth of signalling channels (e.g. 16/64 kbps D-channels verses 10 Mbps packet) and simplicity of communication (e.g. n physical connections verses n(n−1) physical connections).

In the attainment of the foregoing primary object, the present invention, in one aspect, provides a system private network signalling message over a packet network. The system comprises: (1) an encapsulation circuit, coupled to a transmitting user station, capable of receiving the private network signalling message from the transmitting user station, the encapsulating circuit encapsulating the signalling message within, and adding source and destination addresses to, a routable protocol frame, the source and destination addresses corresponding to addresses of the transmitting user station and a particular receiving user station, the encapsulation circuit queuing the routable protocol frame for transmission over the packet network and (2) a de-encapsulation circuit, coupled to the particular receiving user station, capable of receiving the routable protocol frame, the de-encapsulation circuit extracting the signalling message from the routable protocol frame, the packet network thereby simulating a point-to-point connection between the transmitting and particular receiving user stations to effect node-to-node private network signalling therebetween.

Thus, this aspect of present invention allows private network signalling to be routed over a packet network. The signalling messages, designed for node-to-node isochronous communication, are encapsulated into packets, allowing the packet network to route the encapsulated messages as though they are simply computer data. Fundamentally, the present invention allows a shared packet network backbone to simulate a web of discrete node-to-node signalling connections.

In a preferred embodiment of this aspect of the present invention, the routable protocol frame is a User Datagram Protocol/Internet Protocol ("UDP/IP") frame.

Those of skill in the art will understand that the present invention is applicable to any routable protocol frame. However, as will be shown, UDP/IP is flexible and enjoys wide acceptance as a standard for routing packets.

In a preferred embodiment of this aspect of the present invention, the private network signalling message is a Q.921 framed Q.931 signalling message. A Q.931 extension, or "QSIG", signalling message is established at the network level between switching nodes in the system of the present invention.

Those of skill in the art are familiar with the substance and advantages of Q.921, Q.931 and QSIG signalling but also understand that other, known signalling standards are within the scope of the present invention.

In a preferred embodiment of this aspect of the present invention, the packet network comprises redundant backbones coupling the encapsulation circuit and the de-encapsulation circuit.

One of the hallmarks of a well-designed multimedia system is reliability. The present invention, in this preferred embodiment, employs redundancy often found in communication networks to enhance signalling reliability. By providing redundant backbones, the present invention in effect provides redundant node-to-node signalling webs.

In a preferred embodiment of this aspect of the present invention, the transmitting user station is capable of creating a user information path via an isochronous channel, the isochronous channel created on an isochronous network selected from the group consisting of: (1) an ATM network and (2) a Public Switched Digital Network ("PSDN"). Thus, the present invention preferably provides for out-of-circuit signalling wherein the signalling and call processing are handled over the packet network and the user information path, carrying the substantive data, is handled in a dedicated isochronous channel over the isochronous network. Again, "in-band," for the purposes of the present invention, is defined as use of the same physical path for signalling and user information, such as voice, circuit mode and video data. "In-circuit, out-of-band" is defined, for purposes of the present invention, as signalling that, although carried over the same physical medium as the user information path, is logically regarded as a separate channel. "Out-of-circuit" signalling is defined as signalling that traverses a completely different physical circuit than does the user information path.

In a preferred embodiment of this aspect of the present invention, the particular receiving user station is coupled to a second encapsulation circuit and said transmitting user station is coupled to a second de-encapsulation circuit, the particular receiving user station thereby capable of transmitting a subsequent signalling message to the transmitting user station in response to receipt of the signalling message from the transmitting user station. Thus, the present invention provides for bidirectional communication of signalling messages over the packet network.

In a preferred embodiment of this aspect of the present invention, the packet network is free of transit nodes. Those of skill in the art recognize that private network signalling protocols, such as Q.931, commonly provide for intermediate transit nodes for both signalling and information transport. Such nodes, while necessary in a traditional webbed network introduce transmission delays and complicate the network. Since the present invention adapts such signalling to packet networks, the need for signalling transit nodes is eliminated, thereby simplifying communication of signalling messages.

In a preferred embodiment of this aspect of the present invention, a user information path coupling the transmitting and receiving user stations is free of private network signalling messages. While the present invention may allow for both in-band and out-of-band signalling, the present invention is preferably directed toward out-of-band signalling, wherein signalling is communicated along a separate path from user information.

In a preferred embodiment of this aspect of the present invention, the packet network comprises a plurality of encapsulation circuit/de-encapsulation ("E/D") circuit pairs, each of the pairs functioning as an addressable node on the packet network.

In a preferred embodiment of this aspect of the present invention, the encapsulation and de-encapsulation circuits comprise sequences of executable software instructions. Those of skill in the art will recognize, however, that the encapsulation and de-encapsulation circuits can be embodied in discrete or integrated hardware, or as firmware associated with a programmable device.

In the attainment of the foregoing primary object, the present invention, in another aspect, provides a bridge for communicating a MAC layer frame over an isochronous channel, comprising: (1) a frame reception and storage circuit coupled to a nonisochronous network, the frame reception and storage circuit capable of receiving the MAC layer frame from the nonisochronous network and storing the MAC layer frame in the frame reception and storage circuit and (2) a frame encapsulation circuit coupling the frame reception and storage circuit and the isochronous signalling channel, the frame encapsulating circuit capable of encapsulating the stored MAC layer frame into a first frame and queuing the first frame for transmission over the isochronous signalling channel. This aspect is directed, therefore, to transport of MAC layer packets over a private isochronous signalling channel, such as the D channel of an IEEE 802.9 link.

In a preferred embodiment of this aspect of the present invention, the MAC layer frame comprises a cyclical redundancy check (CRC), the frame encapsulation circuit stripping the CRC from the MAC layer frame. The CRC allows verification of the data in the MAC layer frame. This is not required for isochronous signalling channel transport; therefore, it is eliminated.

In a preferred embodiment of this aspect of the present invention, the frame encapsulation circuit is further capable of (a) negotiating a larger maximum frame size by generating and receiving transmit identification ("XID") messages over the isochronous signalling channel and (b), if the negotiating is unsuccessful, dividing the stored MAC layer frame into first and second segments, individually encapsulating the first and second segments into first and second frames, respectively, assigning a segment number to each of the first and second frames and queuing the first and second frames for transmission over the isochronous signalling channel. If the larger maximum size is received, the first and second frames may be larger. The larger frame size may eliminate the need to segment the MAC layer frame. If the larger size is not granted, segmentation becomes a more likely requirement. It is desirable to avoid segmentation whenever possible because of the added overhead involved (as will be described). However, some systems may not support a larger frame size. Thus, the present invention provides for segmentation to accommodate such systems.

In a preferred embodiment of this aspect of the present invention, the first and second frames each comprise an address field and a control field. In a related, preferred embodiment of this aspect of the present invention, the first and second frames are Q.921 Unacknowledged Information frames.

In a preferred embodiment of this aspect of the present invention, the frame encapsulation circuit is further capable of receiving third and fourth frames from the isochronous signalling channel and de-encapsulating and concatenating the third and fourth frames to form a MAC layer frame for transmission over the nonisochronous network. Thus, the present invention is bidirectional.

In a preferred embodiment of this aspect of the present invention, the nonisochronous network is an Ethernet® network. Ethernet® networks are widely used and well accepted. Those of skill in the art are familiar with other nonisochronous network topologies, such as Token Ring® by IBM, that are within the broad scope of the present invention.

In a preferred embodiment of this aspect of the present invention, the first and second frames each comprise last segment and current segment length fields. These field cooperate to provide the segmentation scheme. Each frame containing segmented data contains an indication of the length of the segment and whether it is the last frame of the sequence.

In a preferred embodiment of this aspect of the present invention, the first frame comprises a total MAC layer frame length field. This field thus gives an indication to the receiving device of the length of the MAC layer frame, useful for reconstruction purposes.

In a preferred embodiment of this aspect of the present invention, the MAC layer frame is an Ethernet® frame. Again, Ethernet® is a widely recognized standard for packet networking.

In the attainment of the foregoing primary object, the present invention, in yet another aspect, provides a bridge for communicating an isochronous signalling frame over a nonisochronous network, comprising: (1) a frame reception circuit coupled to an isochronous channel, the frame reception circuit capable of receiving the isochronous signalling frame from a subordinate device via the isochronous channel and (2) a frame encapsulation circuit coupling the frame reception circuit and the nonisochronous network, the frame encapsulating circuit capable of encapsulating the isochronous signalling frame into a routable protocol frame and queuing the routable protocol frame for transmission over the nonisochronous network to a destination device, the nonisochronous network thereby capable of simulating a point-to-point connection between the subordinate device and the destination device.

In particular, this aspect allows a packet network to support multiple servers and multimedia hubs, thereby enhancing the scalability and reliability of multimedia systems. The destination device, acting as a server or multimedia manager, handles top-level allocation of isochronous resources. Signalling messages, generated by the subordinate device, can be routed via the nonisochronous, packet network, to the destination device.

In a preferred embodiment of this aspect of the present invention, the routable protocol is a UDP/IP frame, the frame encapsulation circuit further capable of setting a source address field of the routable protocol frame equal to an address of the bridge and setting a destination address field equal to an address of the destination device. As previously described, UDP/IP is a recognized standard advantageously applicable to the present invention.

In a preferred embodiment of this aspect of the present invention, the frame encapsulation circuit is further capable of receiving a subsequent routable protocol frame from the destination device via the nonisochronous network, the encapsulation circuit de-encapsulating a subsequent isochronous signalling frame from the routable protocol frame and queuing the isochronous signalling frame for transmission over the isochronous channel. Thus, the present invention preferably provides bidirectional communication.

In a preferred embodiment of this aspect of the present invention, the routable protocol is a UDP/IP frame, the frame encapsulation circuit further capable of setting a UDP source port equal to a link number of the subordinate device. In a related preferred embodiment of this aspect of the present invention, the frame encapsulation circuit is further capable of setting a UDP destination port equal to a well-known call processing port. As will be described, source and destination ports are used to direct the frame through the network.

In a preferred embodiment of this aspect of the present invention, the isochronous signalling frame is a Q.921 signalling frame. As previously described, such frames are well known in the art.

In a preferred embodiment of this aspect of the present invention, the nonisochronous network is an Ethernet® network. In a related, preferred embodiment of this aspect of the present invention, the frame reception circuit is further capable of validating a frame check sequence number of the isochronous signalling frame.

In a preferred embodiment of this aspect of the present invention, the reception circuit is coupled to a plurality of subordinate devices via a plurality of isochronous channels. Thus, the reception circuit is preferably embodied in a hub that, in the context of a multimedia system, is a multimedia hub.

In a preferred embodiment of this aspect of the present invention, the nonisochronous network couples a plurality of bridges and destination devices, the nonisochronous network simulating a plurality of point-to-point isochronous channels coupling the plurality of bridges and destination devices.

The present invention further provides methods of: (1) communicating a private network signalling message over a packet network, (2) communicating a Media Access Control (MAC) layer frame over an isochronous channel and (3) communicating an isochronous signalling frame over a nonisochronous network.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
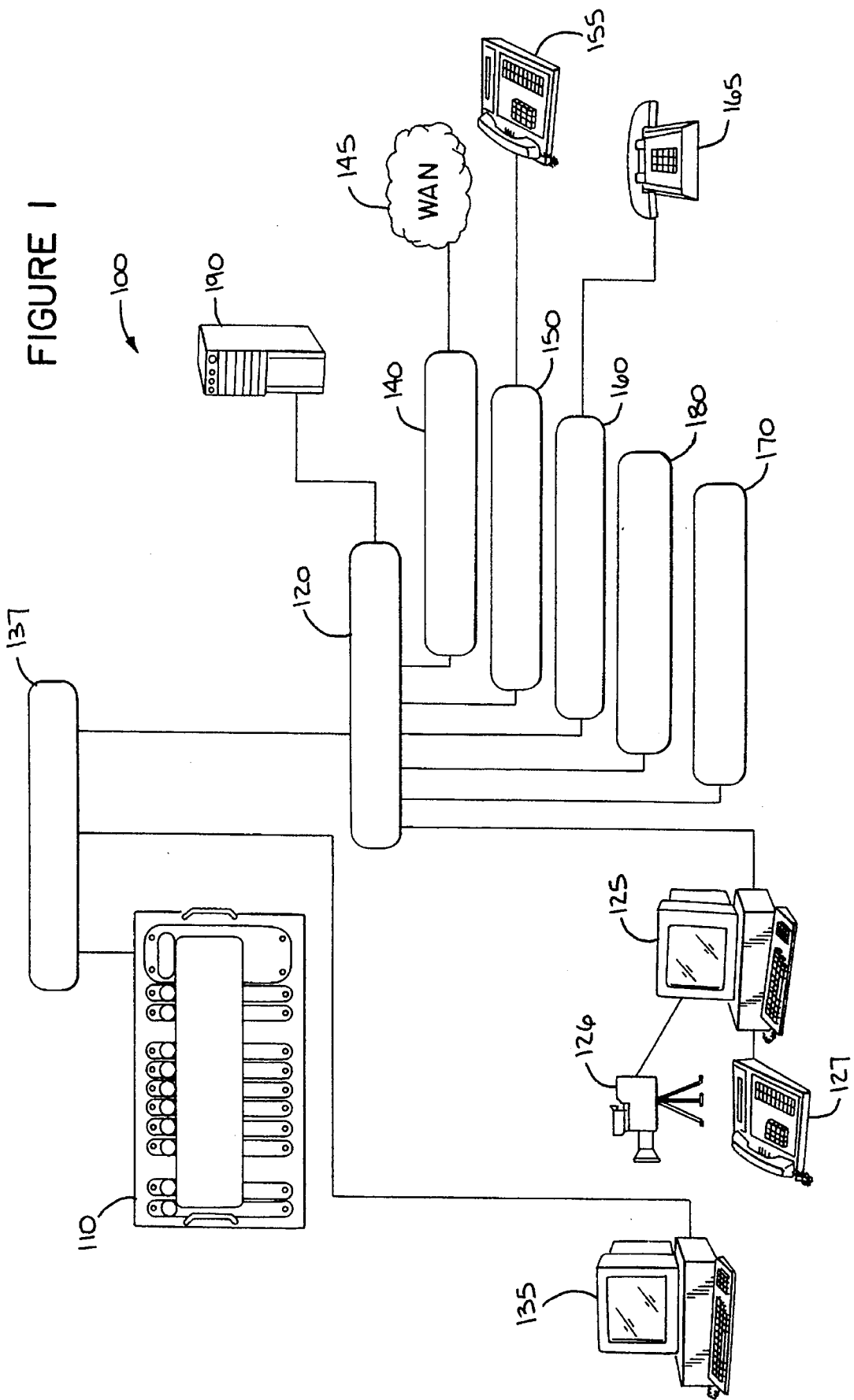
FIG. 1 illustrates a system diagram of an interactive multimedia system employing the signalling subsystem of the present invention.

Referring initially to FIG. 1, illustrated is a system diagram of an interactive multimedia system employing the signalling subsystem of the present invention.

The system, generally designated 100, may comprise a multimedia chassis 110 adapted to receive a plurality of cards therein. The system 100 may alternatively or additionally comprise a plurality of hubs in separate chassis. In the latter case, each of the hubs would contain one of the cards otherwise located in the multimedia chassis 110. Because the hubs are separate from each other, the following discussion will be directed to hubs as opposed to cards in the multimedia chassis 110, although it should be understood that the hubs can as easily exist as cards within the multimedia chassis 110.

A multimedia hub 120 forms a principal component of the system 100. In the illustrated embodiment, the multimedia hub 120 contains the following functions: 10Base-T hub repeater, B-channel switch, isoEthernet® interfaces (allowing a subordinate device such as a multimedia PC 125, including an associated video camera 126 and telephone instrument 127, to be coupled thereto), encapsulated D channel over IP bridge, encapsulated IP over D-channel bridge, tone plant, digital signal processing ("DSP") functions (such as a conference bridge, tone detection, call progress detection, multimedia record/playback and a music interface) and a System Network Management Protocol ("SNMP") agent. Thus, it is readily apparent that most of the system 100 functions involving translation or bridging among standards is handled in the multimedia hub 120.

An ATM hub 137 provides bridging between the multimedia chassis 110 and/or one or more multimedia hubs 120. This allows the system 100 to interface with an ATM backbone. The ATM hub 137 preferably contains 16 155 Mbps OC-3c ATM interfaces. Thus, the ATM hub 137 can be connected to as many as 16 multimedia hubs 120 or non-multimedia PCs 135. The ATM hub 137 may interface to an ATM backbone (not shown) via a higher rate OC-x ATM hub 137.

An ISDN Primary Rate Interface ("PRI") hub 140 provides a bridge to a WAN 145 through multiple ISDN T1 or E1 Primary Rate interfaces. The ISDN PRI hub 140 contains two isoEthernet® interfaces. This provides redundant connections between the ISDN PRI hub 140 and one or two multimedia hub(s) 120.

An ISDN BRI hub 150 provides a bridge for ISDN BRI telephone instruments and interfaces 155. A workstation (not shown) may therefore control its telephone via Ethernet®. The ISDN BRI hub 150 is capable of associating the workstation with its corresponding telephone since the ISDN BRI hub 150 has access to both Ethernet® and D-channel signalling. The ISDN BRI hub 150 appears as the network end to the ISDN BRI instruments and interfaces 155 and supports NI-2 compatible BRI instruments only.

The ISDN BRI hub 150 contains between 12 and 24 BRI interfaces. As with the ISDN PRI hub 140, the ISDN BRI hub 150 contains two isoEthernet® interfaces. This provides redundant connections between the ISDN BRI hub 150 and the multimedia hub 120.

An analog telephony hub 160 provides connectivity for Plain Old Telephone Sets ("POTS") 165. The analog telephony hub contains coder/decoders ("CODECs") and DSP functionality. Consequently, the POTS 165 appear to the system 100 as BRI sets. Furthermore, a workstation (not shown) may control its POTS 165 via Ethernet®. The analog telephony hub 160 is capable of associating the workstation with its corresponding telephone since the analog telephony hub 160 has access to both Ethernet® and D-channel signalling. The analog telephony hub 160 contains 12–24 analog ports. Again, as with the ISDN PRI hub 140 and the ISDN BRI hub 150, the analog telephony hub 160 contains two isoEthernet® interfaces. This provides redundant connections between the analog telephony hub 160 and the multimedia hub 120.

A 10Base-T hub 170 provides 24 SNMP-managed 10 Base-T ports. The 10Base-T hub 170 further provides an Ethernet® AU interface and a single 10Base-F network interface.

An isoBridge hub 180 provides a bridging function between an isochronous network and a packet network. The isoBridge hub 180 is typically used in work-at-home applications wherein an end station is communicating via a fax/modem through an isochronous WAN into a packet-based Ethernet®. The isoBridge hub 180 performs the conversion of fax/modem data and HDLC data to and from Ethernet® packets. The isoBridge hub 180 contains no station interface but does contain two isoEthernet® network interfaces.

A server or multimedia manager 190 is coupled to the multimedia hub 120. The server performs a variety of connection management, feature management and system management functions. The server is preferably comprised of server software executing on widely-available server platforms, such as Intel, MIPS and Digital Equipment Corporation (DEC) Alpha servers. The operating system of choice is Microsoft® Windows® NT Server, adapted to execute on the above-listed servers.

Given this flexible platform, the server 190 is capable of the following features: preemptive multicasting, symmetric multiprocessing ("SMP"), security, executing virtual device drivers, multiple packet network stacks (such as TCP/IP and IPX), reliability (redundant array of inexpensive disks ("RAID"), for instance), multiple languages and SNMP management. The server 190 further contains a management function, effected in the illustrated embodiment by Hewlett-Packard's OpenView® and an object-oriented database.

Signalling functions between the subordinate device 125 and the multimedia hub 120 are accomplished over the D-channel, and the D-channel interface is that of the IEEE 802.9a. Although it is commonly understood that other interfaces may also be used. The multimedia hub 120 thus acts as a concentrator for multiple IEEE 802.9a links. Each link is functionally defined as a point-to-point Q.921 connection, at the data link layer within the isochronous control network, or interchangeably as a Q.931 connection, at the network layer within the isochronous control network.

The communications path between the multimedia hub 120 and its controlling multimedia managers 190, and between multiple multimedia managers, however, is a standard IEEE 802.3 CSMA/CD Ethernet® Media Access Control (MAC) frame format link. Although it is commonly understood that other interfaces may also be used. The MAC frame format link is the data link layer within the packet-based network, while a routable protocol frame within the transport layer of the packet-based network is a User Datagram Protocol/Internet Protocol ("UDP/IP") frame.

The systems of the present invention provide a bridge for communicating an isochronous signalling frame, from the D-channel, over a nonisochronous network, such as the packet network. Conversely, the systems of the present invention provide a bridge for communicating a MAC layer frame, from the packet network, over an isochronous signalling channel, such as the D-channel. Furthermore, the systems of the present invention provide a method for communicating private network signalling messages between nodes in the private and public network over a packet network.

For the relevant standards, see, CCITT Recommendation Q.921, "ISDN User—Network Interface Data Link Layer Specification," Blue Book, ITU, 1988 and CCITT Recommendation Q.931, "ISDN User—Network Interface Layer 3 Specifications for Basic Call Control," Blue Book, ITU, 1988 and IEEE Proposed Standard 802.9a, "Isochronous services with Carrier Sense Multiple Access with Collision Detection (CSMA/CD) Media Access Control (MAC) service", December 1994.

Figure 2:
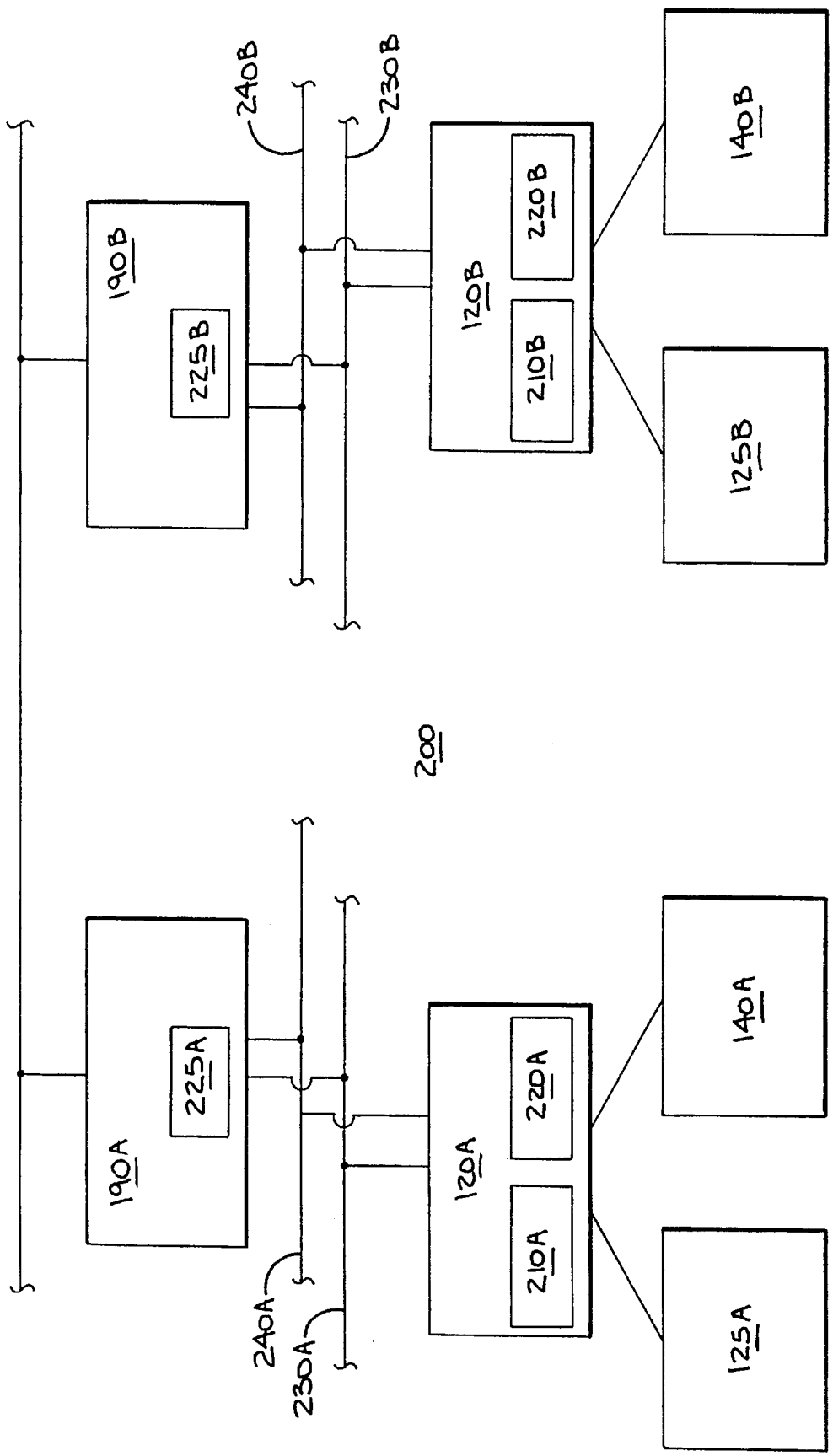
FIG. 2 illustrates a packet-based network employing the signalling subsystem of the present invention.

Turning now to FIG. 2, illustrated is a packet-based network 200 employing the signalling subsystem of the present invention. Within multimedia hub A 120A is frame reception and storage circuit A 210A and a bridging encapsulation/de-encapsulation ("E/D") circuit A 220A. The frame reception circuitry (not shown) in frame reception and storage circuit A 210A is coupled to the isochronous D-channel located between subordinate device A 125A and multimedia hub A 120A. The frame reception circuit receives the private network signalling message from subordinate device A 125A via the isochronous channel.

The frame encapsulation circuit of bridging E/D circuit A 220A couples the frame reception circuit and the nonisochronous, packet-based network. The frame encapsulation circuit encapsulates the private network signalling message into a MAC layer frame, thereby assigning a header and trailer for a MAC frame format and for a routable protocol frame. The header of the routable protocol assigns routing information and the MAC frame format provides data link connectivity for the private network signalling message to ensure proper end-to-end delivery of an accompanying data packet. The MAC layer frame is then queued up for transmission over the nonisochronous network to multimedia manager A 190A.

Within multimedia manager A 190A is signalling E/D circuit A 225A. The de-encapsulation circuitry (not shown) within signalling E/D circuit A 225A extracts the private network signalling message from the MAC layer frame. After determining the destination address is served by multimedia manager B 190B, the encapsulation circuitry (not shown) of signalling E/D circuit A 225A, within multimedia manager A 190A, encapsulates the private network signalling message into a second MAC layer frame, assigns a header and trailer for a MAC frame format and for a routable protocol frame, and queues the Second MAC layer frame for transmission over the nonisochronous network to multimedia manager B 190B.

Within multimedia manager B 190B is signalling E/D circuit B 225B. The de-encapsulation circuitry (not shown) within signalling E/D circuit B 225B extracts the private network signalling message from the second MAC layer frame. After determining that a connection is requested for its client device, subordinate device B 125B, the encapsulation circuitry (not shown) of signalling E/D circuit B 225B, within multimedia manager B 190B, encapsulates the private network signalling message into a third MAC layer frame, assigns a header and trailer for a MAC frame format and for a routable protocol frame, and queues the third MAC layer frame for transmission over the nonisochronous network to multimedia hub B 190B.

Within multimedia hub B 120B is frame reception and storage circuit B 210B and bridging E/D circuit B 220B. The frame reception and storage circuit B 210 B is coupled to the nonisochronous network. The frame reception and storage circuit B 220B receives the third MAC layer frame from the nonisochronous network and stores the third MAC layer frame in the frame reception and storage circuit B 220B.

The de-encapsulation circuitry (not shown) within bridging E/D circuit B 220B couples frame reception and storage circuit B 210B and the isochronous signalling channel located between multimedia hub B 120B and subordinate device B 125B. The de-encapsulation circuit extracts the private network signalling message from the third MAC layer frame and queues the signalling message for transmission over the isochronous signalling channel to subordinate device B 125B. The packet network thereby simulates a point-to-point connection between subordinate devices A and B 125A, 125B to effect node-to-node private network signalling therebetween.

In the illustrated embodiment of the present invention, subordinate device B 125B is thereby capable of transmitting a subsequent private network signalling message to subordinate device A 125A over the nonisochronous, packet-based network. Thus, the present invention provides for bidirectional communication of signalling messages over the packet network.

The signalling subsystem between PRI hub A and B 140A, 140B, through their respective multimedia hubs 120A, 120B and multimedia managers 190A, 190B parallels the signalling subsystem as described with respect to the signalling between subordinate devices A and B 125A, 125B.

The packet network is further comprised of redundant backbones 230A, 240A, 230B, 240B coupling the multimedia hubs A and B 120A, 120B to the multimedia managers A and B 190A, 190B. By providing redundant backbones 230A, 240B, 230B, 240B, the present invention in effect provides redundant node-to-node signalling webs.

As previously discussed, the routable protocol frame is a UDP/IP frame. While this transport packet-based protocol is flexible and enjoys wide acceptance as a standard for routing packets, those of skill in the art will understand that the present invention is applicable to any routable protocol frame. Furthermore, the private network signalling message is a Q.921 framed Q.931 signalling message, but also, other known signalling standards are within the scope of the present invention.

The packet network of the signalling subsystem of the present invention is free of transit nodes. Those of skill in the art recognize that private network signalling protocols, such as Q.931, commonly provide for intermediate transit nodes. Such nodes, while necessary in a traditional webbed network introduce transmission delays and complicate the network. Since the present invention adapts such signalling to packet networks, the need for transit nodes is eliminated, thereby simplifying communication of signalling messages.

It is further understood that a user information path, carrying the substantive data between the subordinate devices A and B 125A, 125B, is free of private network signalling messages. While the present invention preferably provides for out-of-circuit signalling wherein the signalling and call processing are handled over the packet network and the user information path, carrying the substantive data, is handled in a dedicated isochronous channel over the isochronous network, it is appreciated that the signalling subsystem of the present invention is compatible with networks that employ, for instance, in-band signalling.

Finally, the E/D circuits are comprised of sequences of executable software instructions. Those of skill in the art will recognize, however, that the E/D circuits can be embodied in discrete or integrated hardware, or as firmware associated with a programmable device.

Figure 3:
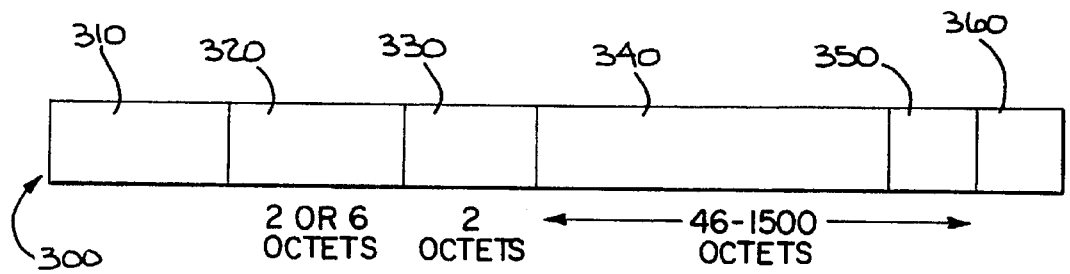
FIG. 3 illustrates a IEEE 802.3 CSMA/CD Ethernet® MAC frame format.

Turning now to FIG. 3, illustrated is a IEEE 802.3 CSMA/CD Ethernet® MAC frame format 300. The MAC data link layer delivers a frame to the E/D process which contains all information present on the physical media exclusive of the preamble and delimiter bits. The size of these frames vary depending on the type of physical media. In the present embodiment, the media type used for discussion is the IEEE 802.3 frame format. The maximum size of the IEEE 802.3 frame format is 1,500 bytes. This frame format is shown in detail in FIG. 3.

The IEEE 802.3 CSMA/CD Ethernet® MAC frame format 300 is comprised of a preamble field (not shown), a start frame delimiter ("SFD") (not shown), a destination address 310, a source address 320, a length field 330, a data unit 340, a Pad field 350 and a cyclical redundancy check ("CRC") 360. The individual frame fields provide the following functions.

The preamble field provides synchronization of the signalling transmitted bidirectionally between the multimedia hub 120 and the multimedia manager 190. The SFD is a "start of frame" character. The destination address 310 and source address 320 provide the MAC layer destination and source address locations. The length field 330 identifies the length of the data unit 340 in bytes or octets. The data unit 340 contains the routable protocol and the signalling data transmitted between the multimedia hubs 120 and the multimedia managers 190. The Pad 350 provides extra characters to achieve a minimum frame length value. Finally, the CRC 360 provides the standard cyclical redundancy check function for detection of errors in the transmitted data.

The IEEE 802.3 CSMA/CD Ethernet® MAC frame format 300 provides data link connectivity for stations, such as the multimedia manager 190, to both transmit and receive data. During a collision along the MAC layer the end stations initiate a "back-off" algorithm and follow a mathematical formula to randomize each stations next attempt to retransmit. The medium can be either baseband or broadband. The specific data link functions of Ethernet® include encapsulation and de-encapsulation of user data, media access management, such as physical layer and buffer management, as well as collision avoidance and handling, data encoding and decoding, and, finally channel access to the LAN medium. Each station on the network can attempt transmission and, if the medium is idle, gain the right to transmit. If they receive a busy, they transmit when the medium becomes idle. If they encounter a collision, they stop transmitting and send a jamming signal to notify all other stations of the collision. The station then waits a random period of time and attempts retransmission.

Figure 4:
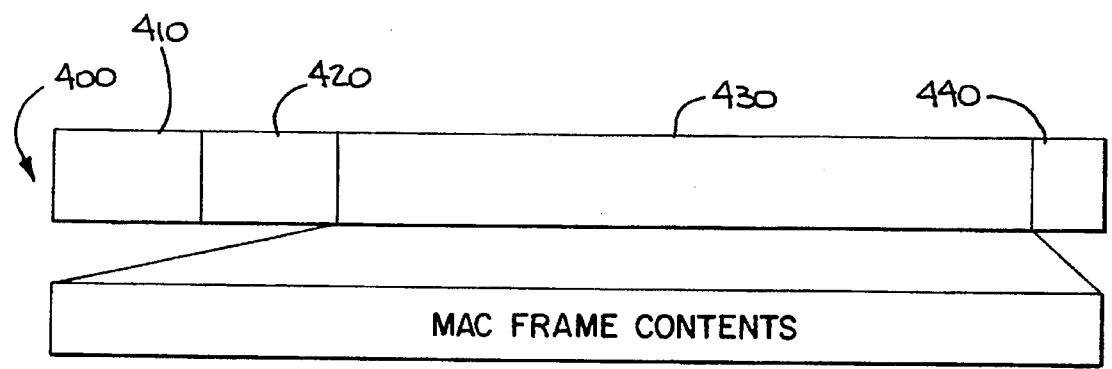
FIG. 4 illustrates a format for an unsegmented MAC frame encapsulation.

Turning now to FIG. 4, illustrated is a format for an unsegmented MAC frame encapsulation. As previously mentioned, the MAC data link layer delivers a frame to the E/D process containing all information present on the physical media exclusive of the preamble and delimiter bits. Upon the receipt of a new MAC frame format 300 at the multimedia hub 120, the E/D process encapsulates the MAC frame in a Q.921 frame 400. The Q.921 frame 400 is an unacknowledged information frame.

A Q.921 frame 400 is comprised of an address field 410, a control field 420, an information field 430, a frame check sequence ("FCS") field 440, and a set of flags (not shown).

To signal the beginning and the end of each Q.921 frame 400, the first and last fields serve as flags each being one byte long. The address field 410 is generally comprised of a Service Access Point Identified ("SAPI") and a Terminal Endpoint Identified ("TEI"). The SAPI defines the access point within the network where the users access the services offered by the service providers. The TEI defines the specific endpoint for a given SAPI, thus completing the virtual circuit.

In theory the SAPI may be any value from 2–62 with 0, 1, 16, and 63 being reserved by CCITT for specific uses. For the purposes of this embodiment, the SAPI is set to 62. Please note that the SAPI may be assigned to any unused SAPI value. Similarly, the TEI may be assigned ally value from 0–126. The value 127 has been reserved for specific usage by CCITT. There are implications for the selection of TEI values in the range of 64–126 and 0–63. These implications are indicated in the CCITT Recommendation Q.921. For the purposes of this embodiment, the TEI is assigned a value of 0.

The control field 420 generally includes information about the message type contained in the information field 430. In the present embodiment, the control field 420 displays a UI to establish that the information field 430 contains unacknowledged information. The information field 430 contains the encapsulated MAC frame format 300, a Q.931 network layer private network signalling message, and between the multimedia hub 120 and multimedia manager 190 (commonly referred to as switching nodes), a Q.931 extension, or QSIG. In addition, the information field 430 is assigned values and fields that are necessary for execution of the E/D processes. See the description with respect to FIG. 5 for an explanation of the type and functions of the assigned fields.

Finally, the FCS field 440 assures the integrity of the Q.921 frame 400. The protocol does not correct the frame, so if there is an error the Q.921 frame 400 will have to be retransmitted. The FCS field 440 is defined as a standard 16-bit cyclical redundancy check sequence.

Figure 5:
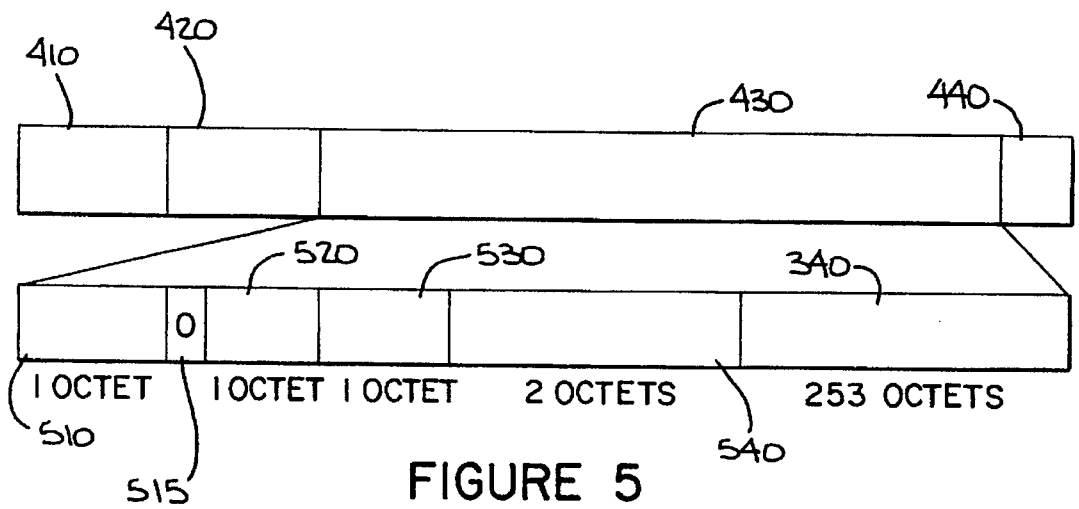
FIG. 5 illustrates a format for a segmented MAC frame encapsulation.

Turning now to FIG. 5, illustrated is a format for a segmented MAC frame encapsulation. When the MAC frame format 300 is longer than the default maximum size allowed for Q.921 frames, initially, the E/D process must request a larger maximum size. This negotiation is done through the exchange of XID messages in accordance with the procedures specified in Appendix IV of CCITT Recommendation Q.921—1988. If the negotiation to the larger value fails, then segmentation of the frame must also be performed by the E/D process. Please note that if the negotiation for the larger maximum length fails, all encapsulation frames will bear the overhead of segmentation control fields.

With the exception of when negotiation of the Q.921 frame 400 deletes the control field, the Q.921 frame 400 for a segmented MAC frame contains the same fields as the Q.921 frame 400 for an unsegmented MAC frame as described with respect to FIG. 4. In addition to the fields discussed with respect to FIG. 4, the information field 430 is assigned a plurality of fields including a message sequence number field 510, a last segment field 515, a segment number field 520, a current segment length field 530, and a total MAC frame length field 540. The working example that follows describes the inner-workings and functions of the assigned fields.

In a segmented MAC frame encapsulation, the first Q.921 frame 400 is assigned the segment number of zero (0). Therefore, the segment number field 520 contains a zero (0). Subsequent Q.921 frames 400 carry segment numbers which increment by one for each Q.921 frame 400. The current segment length may be any value up to and including 255 octets. The current segment length field 530 contains a value corresponding to the length of the present Q.921 frame 400.

In the first frame, the first two bytes or octets following the current segment length field 530 comprise the total MAC frame length field 540. This field holds the count of the total number of octets contained in the original MAC frame format 300. If the total number of octets in the MAC frame format 300 is greater than 253 octets, the MAC frame format 300 is segmented into at least two Q.921 frames 400. The first Q.921 frame 400 has the total MAC frame length field 540 set to the actual count of octets in the data unit 340. The current segment length is set to 255 for all segments accept perhaps the final segment. As shown in the present embodiment, for all segments except the final one, the last segment field 515 is set to zero (0). In the last segment, the last segment field 515 is set to one (1). If the MAC frame format 300 is less than 253 octets in length, the last segment field 515 is set to one (1), the segment number field 520 is set to zero (0), and the current segment length and total MAC frame length fields 530, 540 are set to the actual octet count of the MAC frame format 300.

The MAC frame format 300 of each Q.921 frame 400 is filled with as many octets as possible to complete the current segment length of 255 (unless there are no more MAC frame octets available).

Alternatively, the message sequence number field 510, the last segment field 515, the segment number field 520, the current segment length field 530, and the total MAC frame length field 540 can be appended to the unsegmented MAC frame described with respect to FIG. 4. Functionally, the header information on the unsegmented MAC frame acts as a discriminator to confirm that the MAC frame is an unsegmented frame.

Figure 6:
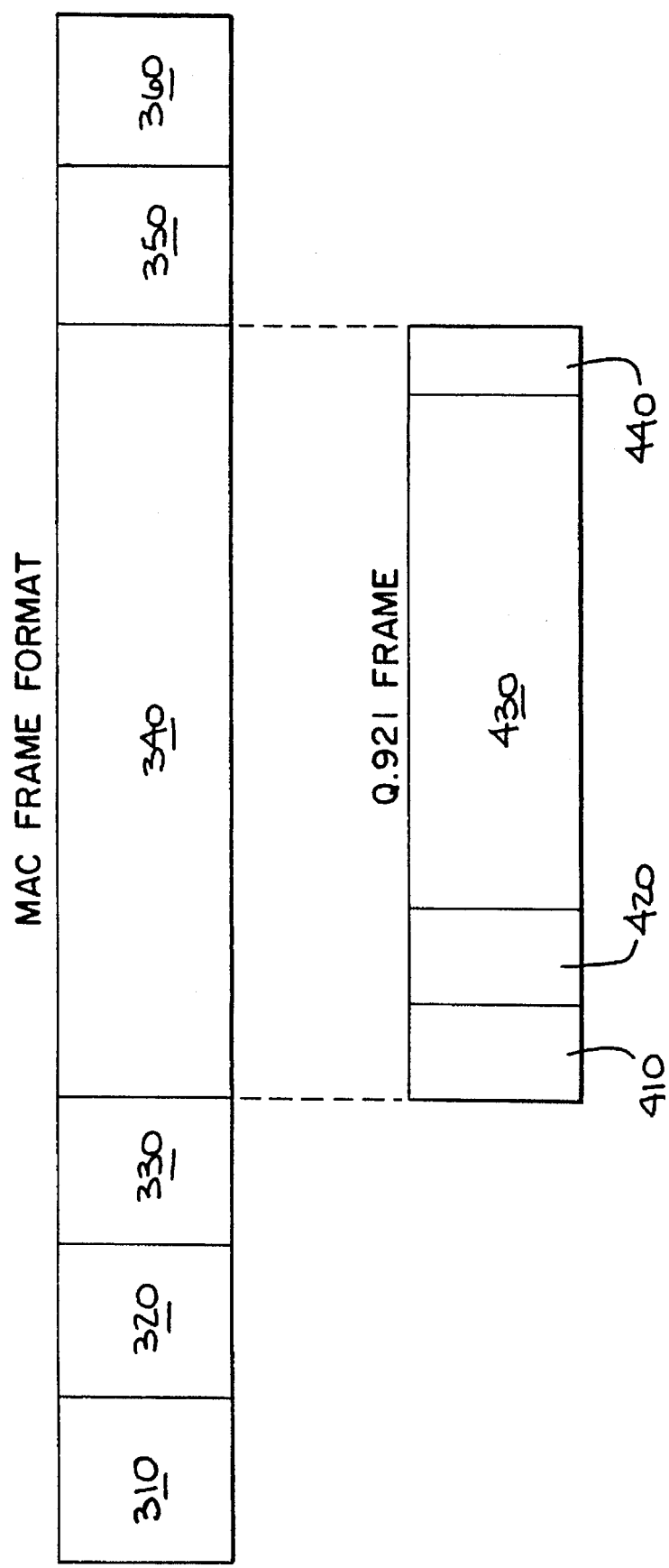
FIG. 6 illustrates a format for a IEEE 802.9a D-channel Q.921 frame encapsulation.

Turning now to FIG. 6, illustrated is a format for a IEEE 802.9a D-channel Q.921 frame encapsulation. A Q.921 private network signalling message is delivered to the multimedia hub 120 over the D-channel by route of the subordinate device 125. To transmit the signalling message over the packet-based network 200, the Q.921 frame 400 is encapsulated into a MAC frame format 300 with the routable protocol and other fields as discussed with respect to FIG. 3.

As illustrated by the preferred embodiment, the Q.921 frame 400 is encapsulated into the data unit 340 of the MAC frame format 300. Upon completion of the encapsulation process at the multimedia hub 120, the data packet encompassing the MAC frame format 300 is set for transmission across the packet-based network 200.

Figure 7:
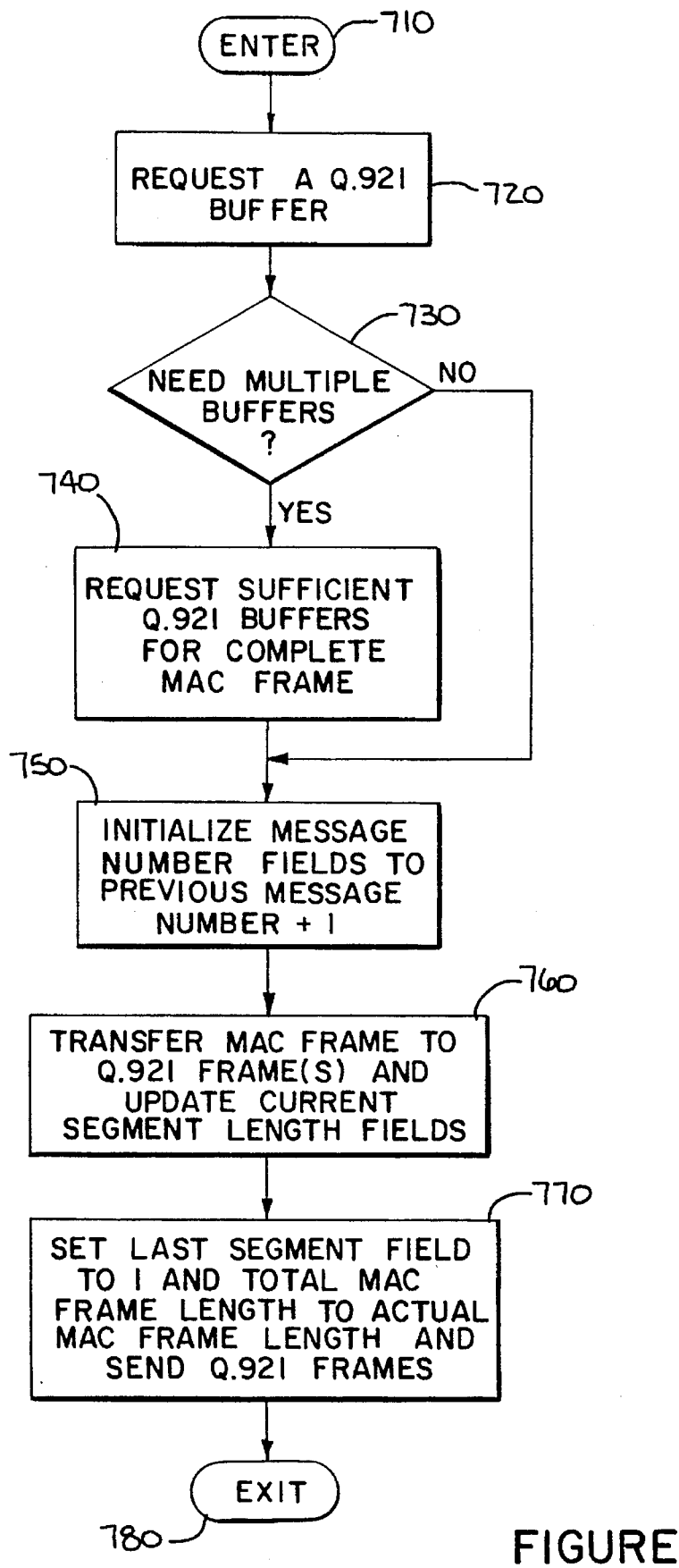
FIG. 7 illustrates a flow chart of the encapsulation process of a MAC frame format.

Turning now to FIG. 7, illustrated is a flow chart of the encapsulation process of a MAC frame format 300. As previously mentioned, the MAC data link layer delivers a MAC format frame 300 to the encapsulation process which contains all information present on the physical media exclusive of the preamble and the SFD. The encapsulation process then commences as follows.

The MAC frame format enters the flow chart at step 710 of the encapsulation process. Step 720 of the process initializes a request for a Q.921 buffer. The Q.921 buffer provides a temporal location for the encapsulation of the MAC level frame. In decisional step 730, the encapsulation process makes a determination if multiple buffers are required. If multiple buffers are required, then in step 740 a request for sufficient Q.921 buffers for a complete encapsulation of the MAC frame 300 is performed. If a single buffer suffices, then the process proceeds to step 750.

In step 750, the message sequence number field 510 is initialized and increased by a single number. This step maintains the sequential integrity of the information. Step 760 transfers the MAC frame format into a Q.921 frame 400. At this time, the header and trailers associated with a Q.921 frame as previously discussed are appended to the MAC frame format 300. Simultaneously, the current length field 530 is updated to match the current length of the MAC frame format 300. In step 770, the last segment field 515 is set to one (1) to symbolize that the present Q.921 frame 400 is the last in a series. Furthermore, the total MAC frame length field 540 is set to the actual MAC frame length and the Q.921 frames 400 are transmitted. In final step 780 the encapsulation process is departed.

Transmitting the Q.921 frames 400 is part of a transport process that is embodied in the system of the present invention. The transport process provides the mechanism for managing a Q.921 frame 400 for an unsegmented MAC level frame and multiple Q.921 frames 400 of a segmented MAC level frame.

The transmission side of the transport process is relatively straight forward. A message number is assigned for each new MAC frame format 300 and each message sequence number field 510 of each Q.921 frame 400 is set to this value. The first Q.921 frame 400 of each MAC frame sequence has the segment number field 520 set to zero (0). Each subsequent Q.921 frame 400 has the segment number field 520 set to the next integer value. The final Q.921 frame 400 also has the last segment flag in the last segment field 515 set to one (1). The Q.921 frames 400 are transmitted as UI frames, no retries are attempted and no transmission error detection is used.

Figure 8:
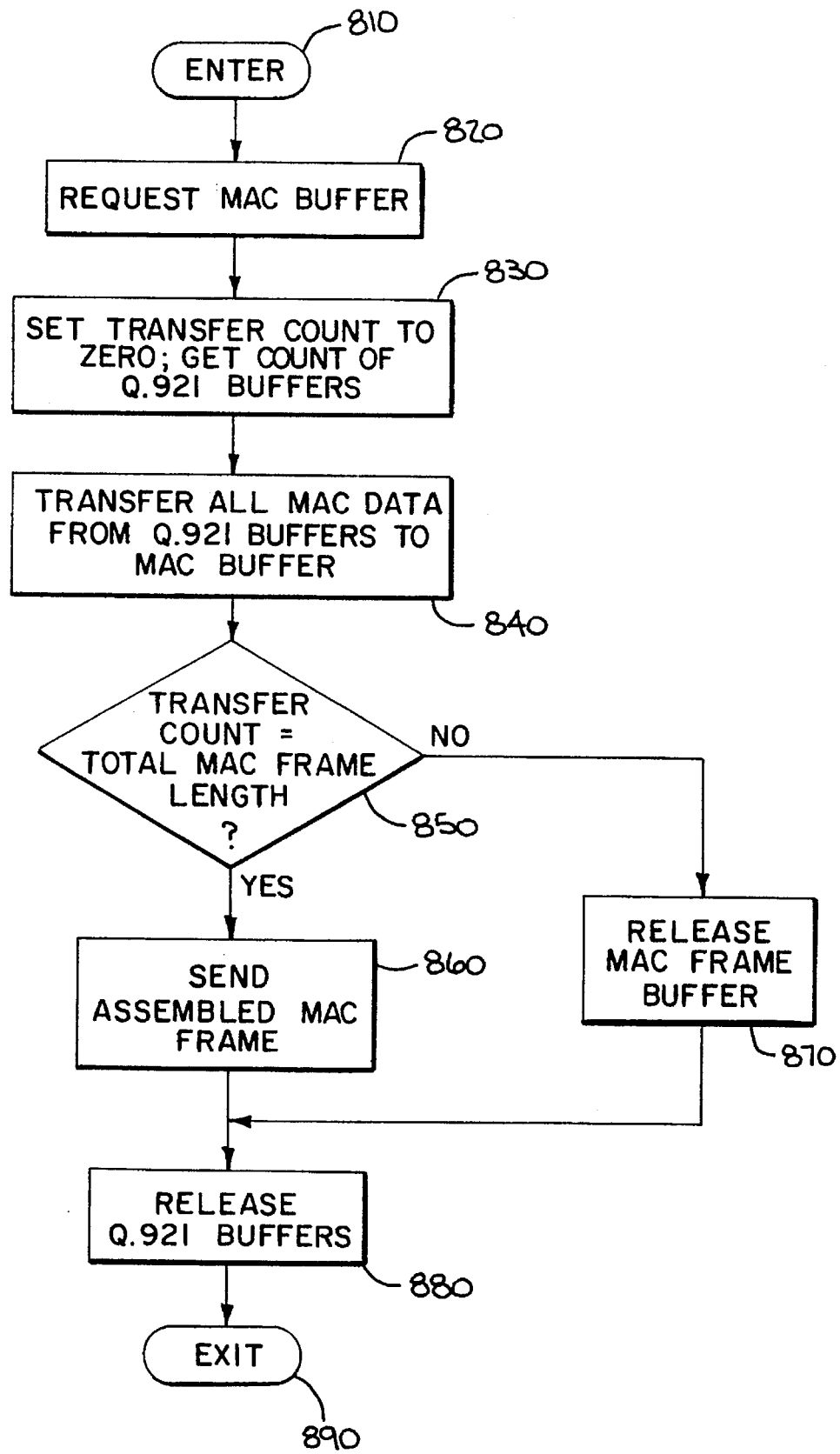
FIG. 8 illustrates a flow chart of the de-encapsulation process of a MAC frame format.

Turning now to FIG. 8, illustrated is a flow chart of the de-encapsulation process of a MAC frame format 300. The Q.921 frames 400 of a given MAC frame enter the de-encapsulation process at the multimedia hub 120 by the transport process embodied in the system of the present invention.

The reception side of the transport process is also relatively straight forward with the additional requirement of error detection. When a Q.921 frame 400 is received with a new message number value, any previous MAC frame sequence which is in progress is aborted and a new MAC frame sequence is started. The first Q.921 frame 400 contains the total MAC frame length field 540 in addition to the MAC frame format 300. The current segment length for each received Q.921 frame 400 is compared against the actual received frame length to make sure all octets of the MAC frame are received. If a Q.921 frame 400 is received with the last segment flag in the last segment field 515 set to one (1), the MAC frame sequence is completed and the set of Q.921 frames 400 are sent to the de-encapsulation process.

Now, if a frame check sequence error is detected, or a new message number is detected before the last segment flag is set to one (1), or the received octet count and the current segment length value cannot be reconciled, or the total MAC frame length field 540 does not agree with the actual total length of the received segments (minus the 2 octets for the initial total MAC frame length field 540) the current MAC frame sequence is aborted and no information is transferred to the de-encapsulation process.

Assuming that the Q.921 frame 400 is successfully received the de-encapsulation process commences. The Q.921 frame 400 enters the flow chart at step 810 of the de-encapsulation process. Step 820 of the process initializes a request for a MAC buffer. The MAC buffer provides a temporal location for the de-encapsulation of the MAC frame format 300 from a Q.921 frame 400. In step 830, the transfer count is set to zero (0) and a count of the Q.921 buffers is performed. Then, the MAC frame format 300 is de-encapsulated from the Q.921 frame 400 by transferring the MAC frame format 300 from the Q.921 buffer to the MAC buffers in step 840.

In decisional step 850, the de-encapsulation process makes a determination if the transfer count is equal to the total MAC frame length. If the transfer count is equal to the total MAC frame length, then in step 860 the assembled MAC frame format 300 is transmitted. If the transfer count is not equal to the total MAC frame length, then in step 870 the MAC frame buffer is released and the de-encapsulation process proceeds to step 880. In step 880, the Q.921 buffers are released and the de-encapsulation process is departed in step 890.

From the above description, it is apparent that the present invention provides a system for communicating a private network signalling message over a packet network and bridges for communicating a MAC layer frame over an isochronous channel and for communicating an isochronous signalling frame over a nonisochronous network. The system comprises: (1) an encapsulation circuit, coupled to a transmitting user station, capable of receiving the private network signalling message from the transmitting user station, the encapsulating circuit encapsulating the signalling message within, and adding source and destination addresses to, a routable protocol frame, the source and destination addresses corresponding to addresses of the transmitting user station and a particular receiving user station, the encapsulation circuit queuing the routable protocol frame for transmission over the packet network and (2) a de-encapsulation circuit, coupled to the particular receiving user station, capable of receiving the routable protocol frame, the de-encapsulation circuit extracting the signalling message from the routable protocol frame, the packet network thereby simulating a point-to-point connection between the transmitting and particular receiving user stations to effect node-to-node private network signalling therebetween.

Although the present invention and its advantages have been described in detail, those skilled in the art should understand that they can make various changes, substitutions and alterations herein without departing from the spirit and scope of the invention in its broadest form.

What is claimed is:

1. A bridge for communicating a Media Access Control (MAC) layer frame over an isochronous signalling channel, comprising:

a frame reception and storage circuit coupled to a nonisochronous network, said frame reception and storage circuit capable of receiving said MAC layer frame from said nonisochronous network and storing said MAC layer frame in said frame reception and storage circuit; and a frame encapsulation circuit coupling said frame reception and storage circuit and said isochronous signalling channel, said frame encapsulation circuit capable of encapsulating said stored MAC layer frame into a first frame and queuing said first frame for transmission over said isochronous signalling channel.

2. The bridge as recited in claim 1 wherein said MAC layer frame comprises a cyclical redundancy check (CRC), said frame encapsulation circuit stripping said CRC from said MAC layer frame.

3. The bridge as recited in claim 1 wherein said frame encapsulation circuit is further capable of (a) negotiating a larger maximum frame size by generating and receiving transmit identification (XID) messages over said isochronous signalling channel and (b), if said negotiating is unsuccessful, dividing said stored MAC layer frame into first and second segments, individually encapsulating said first and second segments into said first frame and a second frame, respectively, assigning a segment number to each of said first and second frames and queuing said first and second frames for transmission over said isochronous signalling channel.

4. The bridge as recited in claim 1 wherein said first frame comprises an address field and a control field.

5. The bridge as recited in claim 1 wherein said first frame is a Q.921 Unacknowledged Information frame.

6. The bridge as recited in claim 3 wherein said frame encapsulation circuit is further capable of receiving third and fourth frames from said isochronous signalling channel and de-encapsulating said third and fourth frames to form a MAC layer frame for transmission over said nonisochronous network.

7. The bridge as recited in claim 1 wherein said nonisochronous network is an Ethernet® network.

8. The bridge as recited in claim 1 wherein said first frame comprises last segment and current segment length fields.

9. The bridge as recited in claim 1 wherein said first frame comprises a total MAC layer frame length field.

10. The bridge as recited in claim 1 wherein said MAC layer frame is an Ethernet® frame.

11. A method of communicating a Media Access Control (MAC) layer frame over an isochronous signalling channel, comprising the steps of:

receiving said MAC layer frame from a nonisochronous network into a frame reception and storage circuit coupled to said nonisochronous network, said frame reception and storage circuit storing said MAC layer frame in said frame reception and storage circuit; and encapsulating said stored MAC layer frame into a first frame with a frame encapsulation circuit coupling said frame reception and storage circuit and said isochronous signalling channel, said frame encapsulation circuit queuing said first frame for transmission over said isochronous signalling channel.

12. The method as recited in claim 11 wherein said MAC layer frame comprises a cyclical redundancy check (CRC), said method further comprising the step of stripping said CRC from said MAC layer frame with said frame encapsulation circuit.

13. The method as recited in claim 11 further comprising the steps of:

negotiating a larger maximum frame size by generating and receiving transmit identification (XID) messages over said isochronous signalling channel with said frame encapsulation circuit; and if said step of negotiating is unsuccessful, dividing said stored MAC layer frame into first and second segments with said frame encapsulation circuit, said frame encapsulation circuit individually encapsulating said first and second segments into said first frame and a second frame, respectively, assigning a segment number to each of said first and second frames and queuing said first and second frames for transmission over said isochronous signalling channel.

14. The method as recited in claim 11 wherein said step of dividing comprises the step of adding an address field and a control field to said first frame.

15. The method as recited in claim 11 wherein said first frame is a Q.921 Unacknowledged Information frame.

16. The method as recited in claim 13 further comprising the step of receiving third and fourth frames from said isochronous signalling channel into said frame encapsulation circuit, said frame encapsulation circuit de-encapsulating said third and fourth frames to form a MAC layer frame for transmission over said nonisochronous network.

17. The method as recited in claim 11 wherein said nonisochronous network is an Ethernet® network.

18. The method as recited in claim 11 wherein said step of dividing comprises the step of adding last segment and current segment length fields to said first frame.

19. The method as recited in claim 11 wherein said step of dividing comprises the step of adding a total MAC layer frame length field to said first frame.

20. The method as recited in claim 11 wherein said MAC layer frame is an Ethernet® frame.

21. A bridge for communicating an isochronous signalling frame over a nonisochronous network, comprising:

a frame reception circuit coupled to an isochronous channel, said frame reception circuit capable of receiving said isochronous signalling frame from a subordinate device via said isochronous channel; and a frame encapsulation circuit coupling said frame reception circuit and said nonisochronous network, said frame encapsulation circuit capable of encapsulating said isochronous signalling frame into a routable protocol frame and queuing said routable protocol frame for transmission over said nonisochronous network to a destination device, said nonisochronous network thereby capable of simulating a point-to-point connection between said subordinate device and said destination device.

22. The bridge as recited in claim 21 wherein said routable protocol is a User Datagram Protocol/Internet Protocol (UDP/IP) frame, said frame encapsulation circuit further capable of setting a source address field of said routable protocol frame equal to an address of said bridge and setting a destination address field equal to an address of said destination device.

23. The bridge as recited in claim 21 wherein said frame encapsulation circuit is further capable of receiving a subsequent routable protocol frame from said destination device via said nonisochronous network, said encapsulation circuit de-encapsulating a subsequent isochronous signalling frame from said routable protocol frame and queuing said isochronous signalling frame for transmission over said isochronous channel.

24. The bridge as recited in claim 21 wherein said routable protocol is a User Datagram Protocol/Internet Protocol (UDP/IP) frame, said frame encapsulation circuit further capable of Setting a UDP source port equal to a link number of said subordinary device.

25. The bridge as recited in claim 21 wherein said routable protocol is a User Datagram Protocol/Internet Protocol (UDP/IP) frame, said frame encapsulation circuit further capable of setting a UDP destination port equal to a well-known call processing port.

26. The bridge as recited in claim 21 wherein said isochronous signalling frame is a Q.921 signalling frame.

27. The bridge as recited in claim 21 wherein said nonisochronous network is an Ethernet® network.

28. The bridge as recited in claim 21 wherein said frame reception circuit is further capable of validating a frame check sequence number of said isochronous signalling frame.

29. The bridge as recited in claim 21 wherein said reception circuit is coupled to a plurality of subordinate devices via a plurality of isochronous channels.

30. The bridge as recited in claim 21 wherein said nonisochronous network couples a plurality of bridges and destination devices, said nonisochronous network simulating a plurality of point-to-point isochronous channels coupling said plurality of bridges and destination devices.

31. A method of communicating an isochronous signalling frame over a nonisochronous network, comprising the steps of:

receiving said isochronous signalling frame from a subordinate device via an isochronous channel into a frame reception circuit coupled to said isochronous channel; and encapsulating said isochronous signalling frame, with a frame encapsulation circuit coupling said frame reception circuit and said nonisochronous network, routable protocol frame and queuing said routable protocol frame for transmission over said nonisochronous network to a destination device, said nonisochronous network thereby capable of simulating a point-to-point connection between said subordinate device and said destination device.

32. The method as recited in claim 31 wherein said routable protocol frame is a User Datagram Protocol/Internet Protocol (UDP/IP) frame, said step of encapsulating further comprising the step of setting a source address field of said routable protocol frame equal to an address of said bridge and setting a destination address field equal to an address of said destination device with said frame encapsulation circuit.

33. The method as recited in claim 31 further comprising the step of receiving a subsequent routable protocol frame from said destination device via said nonisochronous network into said frame encapsulation circuit, said encapsulation circuit de-encapsulating a subsequent isochronous signalling frame from said routable protocol frame and queuing said isochronous signalling frame for transmission over said isochronous channel.

34. The method as recited in claim 31 wherein said routable protocol frame is a User Datagram Protocol/Internet Protocol (UDP/IP) frame, said step of encapsulating comprising the step of setting a UDP source port equal to a link number of said subordinate device.

35. The method as recited in claim 31 wherein said routable protocol frame is a User Datagram Protocol/Internet Protocol (UDP/IP) frame, said step of encapsulating comprising the step of setting a UDP destination port equal to a well-known call processing port.

36. The method as recited in claim 31 wherein said isochronous signalling frame is a Q.921 signalling frame.

37. The method as recited in claim 31 wherein said nonisochronous network is an Ethernet® network.

38. The method as recited in claim 31 wherein said step of receiving comprises the step of validating a frame check sequence number of said isochronous signalling frame.

39. The method as recited in claim 31 wherein said method comprises the step of communicating with a plurality of subordinate devices via a plurality of isochronous channels with said reception circuit.

40. The method as recited in claim 31 wherein said method further comprises the step of communicating with a plurality of bridges and destination devices with said nonisochronous network, said nonisochronous network simulating a plurality of point-to-point isochronous channels coupling said plurality of bridges and destination devices.

41. A subsystem for communicating a private network signalling message over a packet network, comprising:

an encapsulation circuit, coupled to a transmitting user station, capable of receiving said private network signalling message from said transmitting user station, said encapsulation circuit encapsulating said signalling message within, and adding source and destination addresses to, a routable protocol frame, said source and destination addresses corresponding to addresses of said transmitting user station and a particular receiving user station, said encapsulation circuit queuing said routable protocol frame for transmission over said packet network; and a de-encapsulation circuit, coupled to said particular receiving user station, capable of receiving said routable protocol frame, said de-encapsulation circuit extracting said signalling message from said routable protocol frame, said packet network thereby simulating a point-to-point connection between said transmitting and particular receiving user stations to effect node-to-node private network signalling therebetween.

42. The subsystem as recited in claim 41 wherein said routable protocol frame is a User Datagram Protocol/Internet Protocol (UDP/IP) frame.

43. The subsystem as recited in claim 41 wherein said private network signalling message is a Q.931 signalling message.

44. The subsystem as recited in claim 41 wherein said packet network comprises redundant backbones coupling said encapsulation circuit and said de-encapsulation circuit.

45. The subsystem as recited in claim 41 wherein said transmitting user station is capable of creating a user information path via an isochronous channel, said isochronous channel created on an Asynchronous Transfer Mode (ATM) network.

46. The subsystem as recited in claim 41 wherein said particular receiving user station is coupled to a second encapsulation circuit and said transmitting user station is coupled to a second de-encapsulation circuit, said particular receiving user station thereby capable of transmitting a subsequent signalling message to said transmitting user station in response to receipt of said signalling message from said transmitting user station.

47. The subsystem as recited in claim 41 wherein said packet network is free of a transit node.

48. The subsystem as recited in claim 41 wherein a user information path coupling said transmitting and receiving user stations is free of private network signalling messages.

49. The subsystem as recited in claim 41 wherein said packet network comprises a plurality of encapsulation circuit/de-encapsulation circuit pairs, each of said pairs functioning as an addressable node on said packet network.

50. The subsystem as recited in claim 41 wherein said encapsulation and de-encapsulation circuits comprise sequences of executable software instructions.

51. A method of communicating a private network signalling message over a packet network, comprising the steps of:

receiving said private network signalling message from a transmitting user station into an encapsulation circuit coupled to said transmitting user station, said encapsulation circuit encapsulating said signalling message within, and adding source and destination addresses to, a routable protocol frame, said source and destination addresses corresponding to addresses of said transmitting user station and a particular receiving user station, said encapsulation circuit queuing said routable protocol frame for transmission over said packet network; and receiving said routable protocol frame into a de-encapsulation circuit coupled to a particular receiving user station, said de-encapsulation circuit extracting said signalling message from said routable protocol frame, said packet network thereby simulating a point-to-point connection between said transmitting and particular receiving user stations to effect node-to-node private network signalling therebetween.

52. The method as recited in claim 51 wherein said routable protocol frame is a User Datagram Protocol/Internet Protocol (UDP/IP) frame.

53. The method as recited in claim 51 wherein said private network signalling message is a Q.931 signalling message.

54. The method as recited in claim 51 wherein said packet network comprises redundant backbones coupling said encapsulation circuit and said de-encapsulation circuit.

55. The method as recited in claim 51 further comprising the step of creating a user information path via an isochronous channel with said transmitting user station, said isochronous channel created on an Asynchronous Transfer Mode (ATM) network.

56. The method as recited in claim 51 wherein said particular receiving user station is coupled to a second encapsulation circuit and said transmitting user station is coupled to a second de-encapsulation circuit, said method further comprising the step of transmitting a subsequent signalling message from said particular receiving user station to said transmitting user station in response to receipt of said signalling message from said transmitting user station.

57. The method as recited in claim 51 wherein said packet network is free of a transit node.

58. The method as recited in claim 51 wherein a user information path coupling said transmitting and receiving user stations is free of private network signalling messages.

59. The method as recited in claim 51 wherein said packet network comprises a plurality of encapsulation circuit/de-encapsulation circuit pairs, each of said pairs functioning as an addressable node on said packet network.

60. The method as recited in claim 51 wherein said encapsulation and de-encapsulation circuits comprise sequences of executable software instructions.

61. The subsystem as recited in claim 41 wherein said private network signalling message is a QSIG signalling message.

62. The subsystem as recited in claim 41 wherein said transmitting user station is capable of creating a user information path via an isochronous channel, said isochronous channel created on a Public Switched Digital Network (PSDN).

63. The method as recited in claim 51 wherein said private network signalling message is a QSIG signalling message.

64. The method as recited in claim 51 further comprising the step of creating a user information path via an isochronous channel with said transmitting user station, said isochronous channel created on a Public Switched Digital Network (PSDN).

* * * * *

UNITED STATES PATENT AND TRADEMARK OFFICE
CERTIFICATE OF CORRECTION

PATENT NO. : 5,594,732
DATED : January 14, 1997
INVENTOR(S) : Robert T. Bell, et al.

It is certified that error appears in the above-indentified patent and that said Letters Patent is hereby corrected as shown below:

Col. 3, line 10 "modulaton" should be --modulation--.

Col. 6, line 59 "fundamental." should be --fundamental--.

Col. 18, line 42 "ally" should be --any--.

Col. 24, line 17 "Setting" should be --setting--.

Signed and Sealed this

Twenty-fifth Day of March, 1997

Attest:

BRUCE LEHMAN

*Attesting Officer*     *Commissioner of Patents and Trademarks*